Oct. 7, 1952  G. R. REED  2,612,933
CLIP CLINCHING MACHINE
Filed Jan. 18, 1947                                            2 SHEETS—SHEET 1

INVENTOR.
GEORGE R. REED
BY
McDonald & Fragno
ATTORNEYS

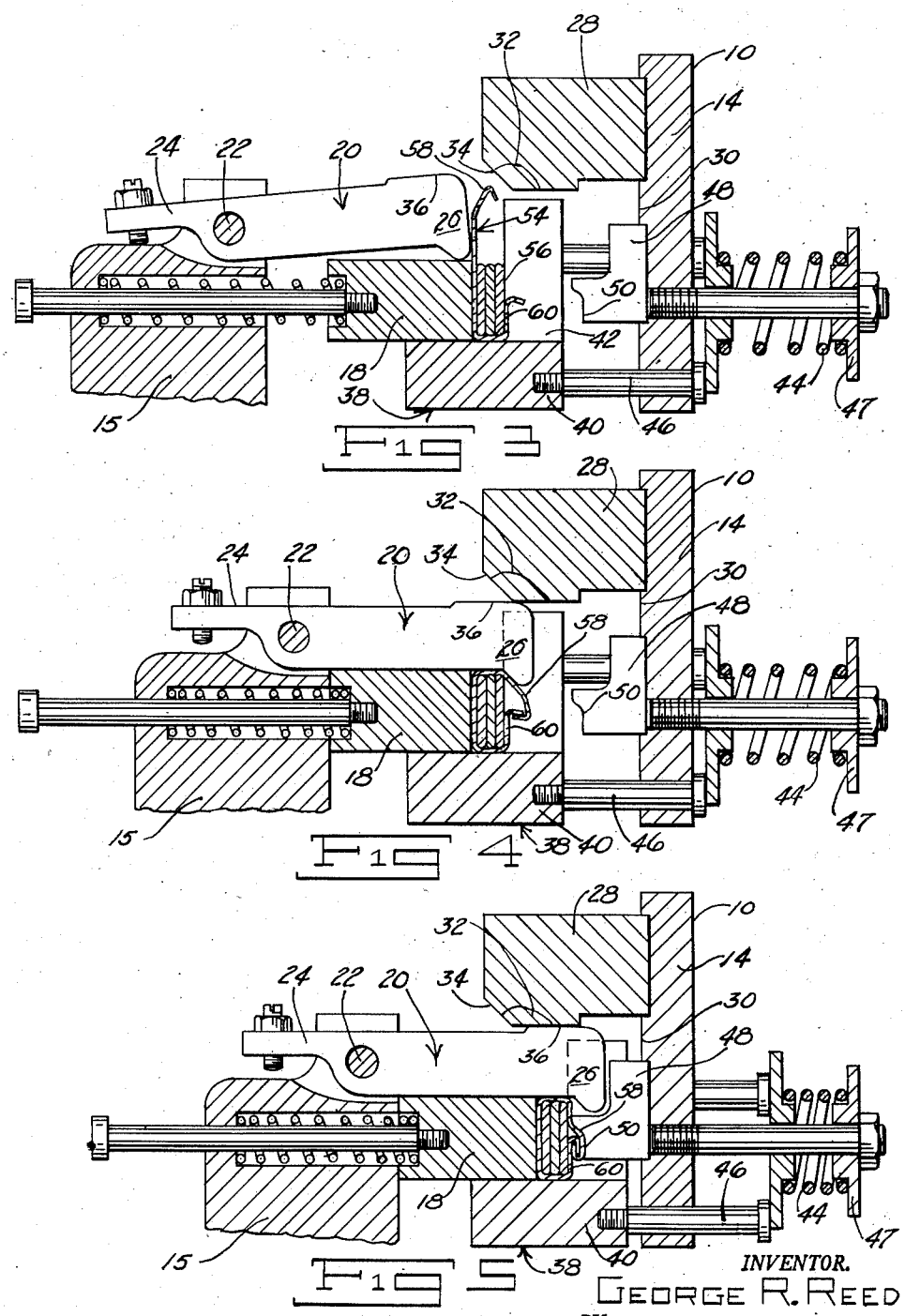

UNITED STATES PATENT OFFICE 2,612,933

CLIP CLINCHING MACHINE

George R. Reed, Grosse Pointe Park, Mich., assignor to Eaton Manufacturing Company, Cleveland, Ohio, a corporation of Ohio Application January 18, 1947, Serial No. 722,899

2 Claims. (Cl. 153—1)

This invention relates to vehicle suspension leaf springs and more particularly to the assembly thereof.

Broadly the invention comprehends the provision of means for clinching clips around an assembly of nested spring leaves for the purpose of retaining the spring leaves in proper assembly for operational use as spring suspension members in vehicles.

Although nested or group assemblies of leaf springs have been produced for a great many years it was not until the innovation of the instant invention that a nest or group of spring leaves was retained at the ends thereof relative to one another by clips arranged in embracing relation to the springs, wherein the clips are clinched upon the assembly of springs by an automatic clinching machine in an easy, quick and efficient manner.

An object of the invention is the provision of means for clamping a plurality of leaf springs together substantially at the ends thereof.

Another object of the invention is the provision of a machine for automatically fastening or clinching clips around a group of leaf springs effective to retain said springs in assembly during the operational use thereof as a vehicle suspension leaf spring assembly.

A further object of the invention is the provision of a machine, automatically operable to clinch spring clips around a plurality of flat spring leaves near the ends thereof effective to retain said springs in assembly and permitting a slight sliding movement between the leaves as required for operational use.

Other objects and advantages of the invention will appear from the following description taken in connection with the drawings, forming a part of the specification; and in which:

Fig. 3 is a sectionalized view of the machine shown by Figs. 1 and 2 illustrating the initial phase of operation thereof.

Fig. 4 is a phase of operation of the machine subsequent to the initial phase thereof, and Fig. 5 illustrates the final phase of operation of the machine.

Figure 1:
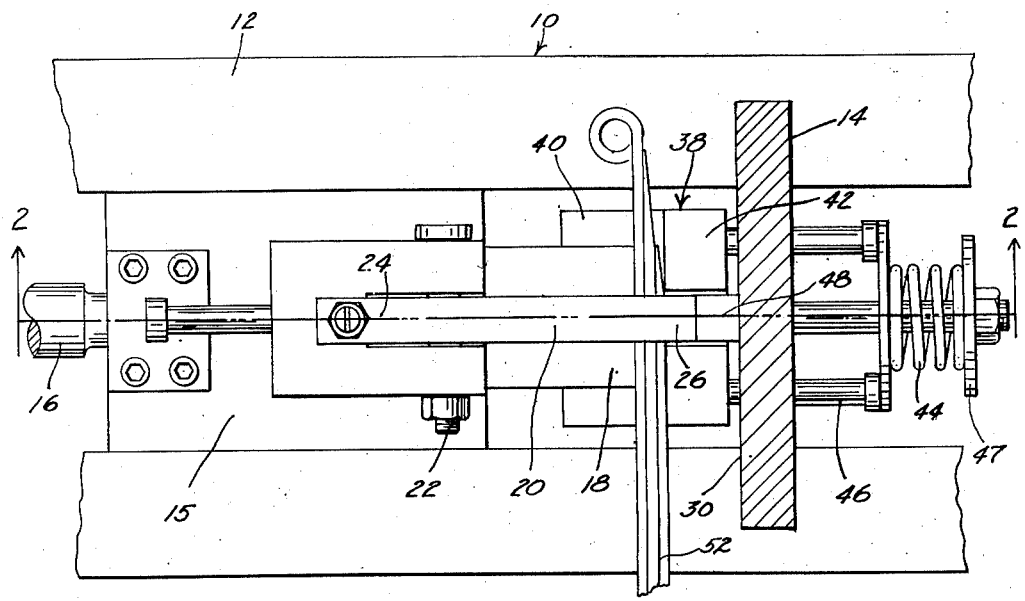
Fig. 1 is a top plan view of a machine for clinching clips upon a vehicle leaf spring assembly taken along the lines 1—1 of Fig. 2.

The present invention was devised to alleviate inefficiencies in the clinching of clips upon leaf spring assemblies for retaining the leaves of springs in proper relation to one another wherein the clips have, prior to this invention, been assembled entirely by manual means. By automatically clinching the clips upon leaf spring assemblies as taught by this invention and as carried out by the illustrated machine a higher quality product is obtained in an easier, quicker and economical manner thereby representing the comparative gain over previously adopted methods of assembly relative to the same operation.

This automatically operable clinching machine is simple in its embodiment in that it constitutes one major actuating member and a pair of stationary members with which the actuating member is cooperable effective to bend the preformed clip to necessary shape conforming with the internal spring assembly shape and thence bring the ends of the clip together into locking engagement with one another.

Referring to the drawings for more specific details of the invention 10 represents generally a leaf spring assembly clip clinching machine comprising a stationary horizontally arranged bed or base 12 having a stationary vertically arranged upright 14 secured thereto.

The base 12 has slidably arranged thereon a head arrangement 15 adapted to be actuated by a shaft 16 from a suitable source of power, not shown, said head comprising a pressure block 18 axially, resiliently supported thereon and relatively movable thereto and a pressure arm 20 pivotally secured upon shaft 22 mounted in the head having a short extension 24 that is adjustable in one pivotal direction at one end thereof and a forming die head 26 on the end thereof oppositely disposed from the extension 24, the purpose of which will hereinafter appear.

The arm 20 engages during a phase of its operation a head member 28 secured to and horizontally extending from the face 30 of upright, said member having a cam face 32 formed on the underside thereof presenting an angular portion 34 and a horizontal portion 36, the purpose of which will hereinafter appear.

The pressure block 18 is adapted, upon the operational actuation thereof when a leaf spring assembly is placed in the machine, to cooperate with a pressure pad 38 comprising a horizontal section 40 and a pair of vertical arms 42, said pressure pad being normally urged in a horizontal direction toward block 18 by a spring 44 that is mounted between a carriage 46 slidably supported upon upright 14 and an end plate 47 fixedly secured upon the back of upright 14.

A stationary forming member 48 is fixedly secured upon the face of upright 14 and provides a die surface 50 on the face thereof cooperable with the other members of the machine for clinching clips upon the spring assemblies.

In a normal operation of the machine wherein a spring assembly 52 comprising a plurality of spring leaves, conventionally secured together through the center of the assembly, not shown, is inserted in the machine with a preformed clip 54, as shown by Fig. 3, manually placed thereon and with the spring assembly arranged vertically therein, wherein one leaf of the assembly bears against the face 56 of arms 42 and one end 58 of the clip is received between the arms 42 and the other end 60 extends substantially, vertically adjacent the spring assembly, the head 15 is actuated from its power source by shaft 16 resulting in initially moving block 18 into engagement with the central portion 62 of the clip resulting in firmly gripping the clip and spring assembly between itself and arms 42.

As the head is further actuated through its horizontal path the nose of forming head 26 on arm 22 engages the end 60 of the clip forcing it forward ahead of the arm, said arm meanwhile being resisted from outward pivotal motion by the adjustment on extension 24. The continued movement of head 15 and arm 20 results in bringing the upper surface of forming die head 26 into engagement with the annular portion 34 of cam surface 32 whereby the arm is pivoted against the end 60 of the clip at a point horizontally beyond the spring assembly effective to thrust the end 60 substantially vertically downward to a position adjacent the end 58 of the clip. Simultaneously with this operation the pressure block maintains the spring assembly in vertically clamped position in that the spring pressure of the block is lighter than that of spring 44 acting upon pressure pad 38 resisting the horizontal movement thereof.

Figure 2:
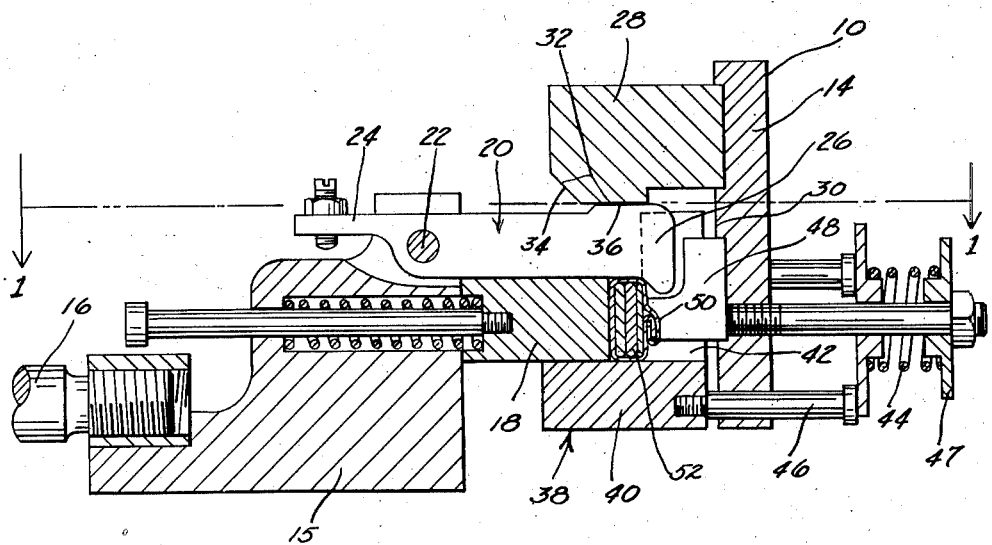
Fig. 2 is a view taken along lines 2—2 of Fig. 1.

With the completion of this phase of operation the movement of block 18 to abutment upon head 15 as shown by Fig. 4 of the drawings, the further actuation of head 15 moves arm 20 and block 18 as a unit against pad 38 thus moving the pad causing resistance of spring 34 wherein the upper surface of arm 20 rides upon the horizontal portion of cam 32 on member 28 and firmly holds the clip in the position of Fig. 2 thus bringing the spring assembly and the clip into engagement with the die surface 59 of forming member 48 thereby affecting by the action of the die face on the ends of the clip the interlocking or clinching of the ends thereof into firm embracement about the spring assembly.

This completes a clip bending and clinching operation of the clip around a spring leaf assembly and immediately upon the release of the spring from the phase of operation of the machine shown by Fig. 5 the machine will be in readiness for another spring assembly and clip for the bending and clinching of the clip thereupon.

It is to be realized that although the phases of operation have been herein described in steps or stages, the clinching of the clip upon the leaf spring assembly is completed in one swift, smooth motion thus providing means for simply, quickly and economically performing said operation.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. Mechanism for clinching the ends of members together comprising a stationary frame, a power actuated member relatively movable thereto, a forming tool pivotally supported thereon, a pressure block resiliently supported on the power actuated member for limited relative movement thereto, said tool extending substantially in the resilient supported direction of the pressure block, a pressure pad resiliently supported on the frame for limited movement relative thereto cooperable in resiliently opposed spaced relation to the pressure block to form a vise jaw therebetween adapted to hold the work upon which the clinching is to be done, said pressure block extending lineally away from the power actuating members, and biased therefrom, a greater distance than the forming tool extends therefrom, in the same direction, and a lesser distance when of minimum extended length relative thereto, a cam fixedly supported on the frame engageable by the forming tool to control the pivotal movement thereof, and a stationary forming tool on the frame disposed centrally of the pressure pad in spaced relation to the pressure block adapted to engage the work held between the resiliently supported block and pad, said pivotal tool having its forming portion pivoted to a position extending beyond the vise jaw portion of the pressure block when the pivotal tool is engaged by the cam.

2. Mechanism for clinching the ends of clips upon an assembly of adjacently arranged members comprising a power actuated member, a pressure block resiliently supported thereon for lineal movement with and limitedly relative thereto, a tool pivotally supported on the power actuated member extending substantially in the resilient supported direction of the pressure block having a work forming portion on one end normally bearing on the pressure block and relatively movable thereto upon relative movement between the power actuated member and block, a stationary frame, a pressure pad resiliently supported on the frame in linear spaced relation to the pressure block cooperable with the pressure block to provide a vise jaw therebetween for clamping the assembly of members and clip therein, said pad being supported resiliently with a greater force than the resilient support for the block, a cam fixedly mounted on the frame engageable with the tool upon relative movement of the power actuated member and block to move the work forming portion of the tool lineally and angularly beyond the end of the block to engage the clip to perform its work thereon, and a forming tool fixedly mounted on the frame in linear spaced relation to the pressure block intermediate a portion of the pressure pad engageable with the ends of the clip held between the block and pad.

GEORGE R. REED.

REFERENCES CITED

The following references are of record in the file of this patent:

UNITED STATES PATENTS

| Number | Name | Date |
|---|---|---|
| 919,804 | Agar | Apr. 27, 1909 |
| 936,799 | McArthur | Oct. 12, 1909 |
| 985,686 | Livingston | Feb. 28, 1911 |
| 1,836,497 | Phelps | Dec. 15, 1931 |
| 1,908,981 | Hicks | May 16, 1933 |
| 1,944,251 | Mansbendel | Jan. 23, 1934 |
| 1,961,582 | Eksergian | June 5, 1934 |
| 2,224,381 | Crabtree | Dec. 10, 1940 |
| 2,295,131 | Scott | Sept. 8, 1942 |
| 2,325,322 | Jackson | July 27, 1943 |
| 2,391,891 | Frankel | Jan. 1, 1946 |